Nov. 3, 1959   C. G. WEST   2,911,177
REAR VIEW MIRROR
Filed Aug. 23, 1956   2 Sheets-Sheet 1
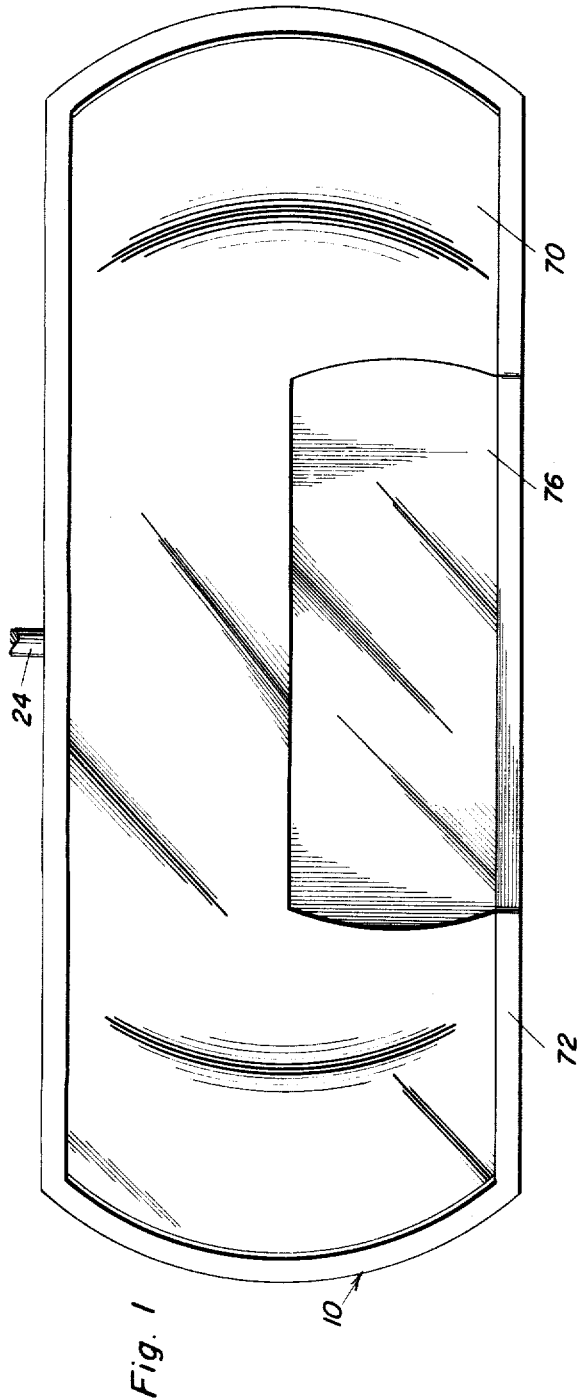
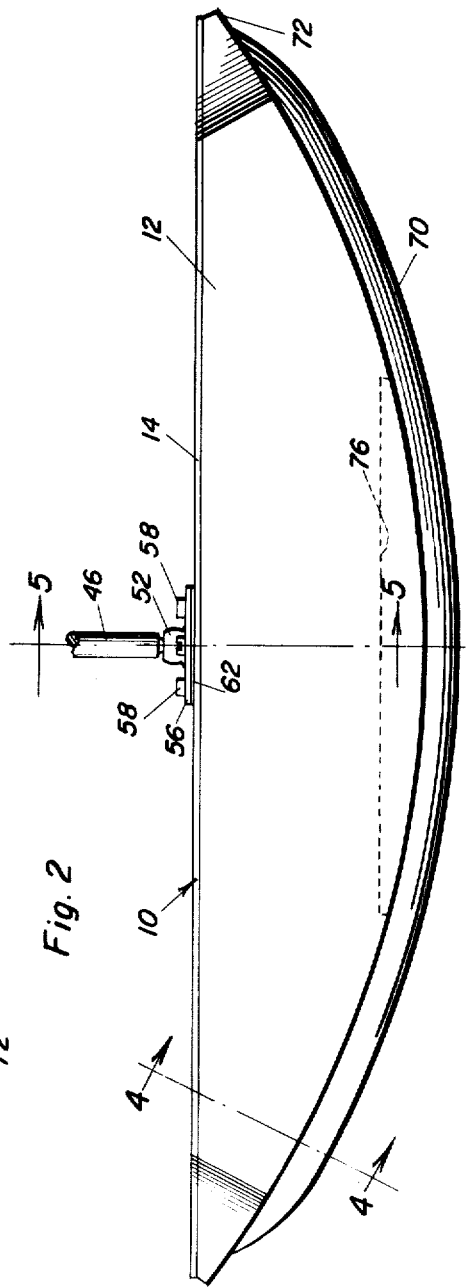
Clifford G. West
INVENTOR.

Nov. 3, 1959  C. G. WEST  2,911,177
REAR VIEW MIRROR
Filed Aug. 23, 1956  2 Sheets—Sheet 2
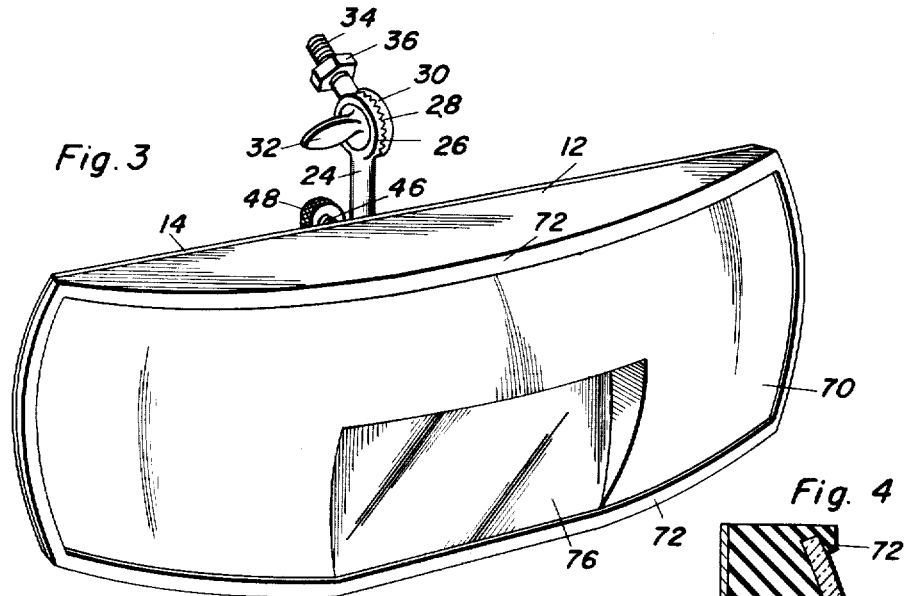
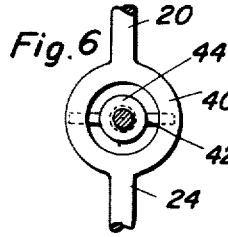
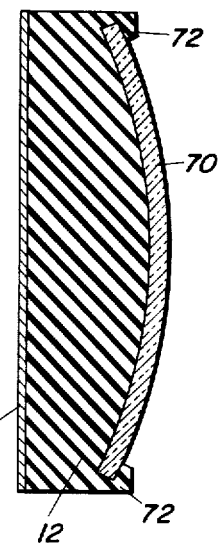
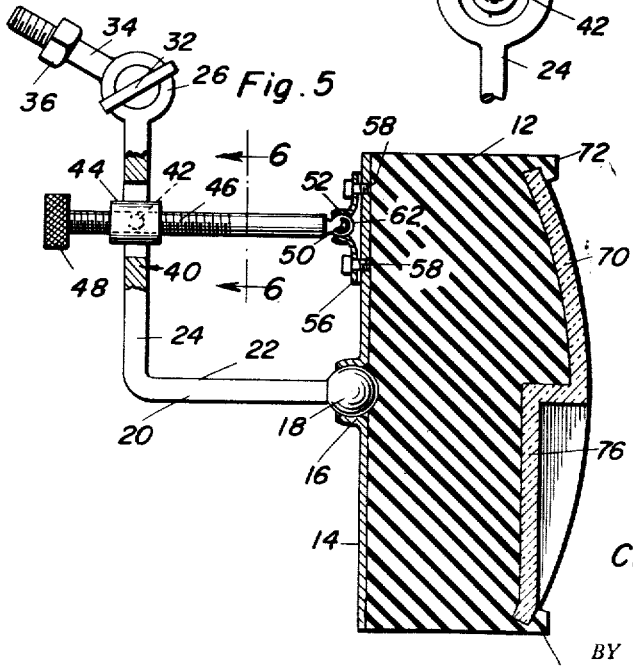
Clifford G. West
INVENTOR.

2,911,177
REAR VIEW MIRROR

Clifford G. West, Alliance, Nebr.

Application August 23, 1956, Serial No. 605,894

4 Claims. (Cl. 248—276)

This invention relates to rear view mirrors for motor vehicles and mirrors of the type which provide wide vision for the motorist.

An object of the present invention is to provide a rear view mirror for a motor vehicle of special construction wherein a wide field of vision is provided for and wherein there are means to present the motorist with a true picture of the field of view adjacent to the rear part of his motor vehicle. In the use of spherical mirrors there is an accompanying distortion and an inaccurate perceived depth with regard to the area adjacent to the motor vehicle. Lack of proper depth perception and distortion in the region of the motor vehicle can be dangerous. Accordingly, a further object of the invention is to provide a multipurpose mirror having a generally spherical segment-shaped reflecting panel affording wide angles of vision, and also having a flat part with attendant narrow angle of vision but providing a true or practically true reflection for the motorist, it being intended that the flat part of the mirror be used for viewing objects that are near the motor vehicle.

Another object of the invention is to provide an improved, adjustable support for the mirror whereby the mirror is capable of positive manual adjustment to all angles within a reasonable range such as would be required on motor vehicles, boats or in other environments.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a front elevational view of a mirror constructed in accordance with the invention;

Figure 2 is a plan view of the mirror of Figure 1;

Figure 3 is a perspective view of the mirror of Figure 1;

Figure 4 is a transverse sectional view taken on the line 4—4 of Figure 2;

Figure 5 is a sectional view taken on the line 5—5 of Figure 2; and

Figure 6 is a sectional view taken on the line 6—6 of Figure 5 illustrating principally a part of the mirror support.

In the accompanying drawings there is a mirror 10 which is constructed in such a way as to demonstrate the principles of the invention. This mirror includes a body 12 which may be of a block of rubber, plastic or like material. When such construction is adopted back plate 14 is adhesively secured to the back surface of the body block and forms a part of the body. This back plate has a partially spherical socket 16 at the center thereof in order to accommodate ball 18, the latter being at one end of the L-shaped support arm 20. Arm 20 together with ball and socket 18 and 16 respectively and other structure hereinafter described constitutes the support for the mirror.

The mirror support is so constructed as to be capable of adjusting the mirror positively, accurately and easily and holding that adjustment after it is once made. This is of importance on motor vehicles of practically all types inasmuch as they are normally subjected to vibrations and shocks. Arm 20 is generally L-shaped and has legs 22 and 24. The leg 22 has ball 18 at its outer extremity while leg 24 has a disk 26 at its outer extremity, this disk having a serrated face to fit flush against the similarly serrated or toothed face 28 of disk 30. A threaded opening is formed in disk 30 to accommodate thumb screw 32 which passes through an aperture in disk 28 thereby holding the adjustment between disks 26 and 30 after such adjustment is selected. Stud 34 is fixed to disk 30 and is adapted to be secured to a suitable part of the motor vehicle. Lock nut 36 is on stud 34 to prevent the stud from turning.

Leg 24 has an eye 40 between its ends. This eye has a transverse pin or spindle 42 mounted in bearings in opposite sides of the eye. The spindle is fixed to an internally threaded collar or sleeve 44, whereby the collar is capable of tilting about the axis of spindle 42. Screw 46 is threaded in the internally threaded collar 44 and has a knurled head 48 to facilitate finger operation. The opposite end of screw 46 has ball 50, the latter being disposed in socket 52.

Socket 52 is formed as part of a plate 56, the latter being bolted as at 58 to the back surface of plate 14. Flat spring 62 is disposed between the back surface of plate 14 and plate 56 in order to provide a slight spring bias against ball 50, this being a friction arrangement so that a reasonably tight fit at the ball and socket is always present regardless of the adjustment. In the operation of the support described herein, thumb screw 46 is adjusted in order to tilt the mirror body 12 upwardly and downwardly about the ball 18, while side to side adjustment of the mirror is effected manually by shifting the body laterally on the two previously described ball and socket assemblies which are located in a common vertical plane.

The mirror body has an oblong light reflecting panel 70 carried by it. This may be accomplished by having a bead 72 around the edge of the body 12 under which the marginal edges of panel 70 are fitted. The panel is of a particular configuration but may be made of various materials such as mirror glass, highly polished metal or any other commonly accepted type of material that functions well as a light reflecting surface. The light reflecting panel is convex, being curved both along its longitudinal axis and along its shorter, transverse axis. The light reflecting panel 70 is in the shape of a segment of a sphere, causing some distortion and reduction in size of images reflected thereby. This slight distortion and size reduction of images causes a false depth perception in use of such a mirror shape. Accordingly, there is a flat part 76 in light reflecting panel 70, it being preferred that the part 76 be inset and accordingly the body 12 will be shaped to accommodate this part. The flat part of the light reflecting panel provides a practically true reflected image and is useful to view objects or events close to the rear part of the motor vehicle. Therefore a multivision mirror is provided with the major portion of the oblong shaped light reflecting panel being a segment of a sphere while the small part 76 thereof is flat, thereby providing optimum reflected visibility for both wide angle vision and specific vision near the rear part of the motor vehicle.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a rear view mirror for a motor vehicle, the combination of a body, a light reflecting panel mounted on said body, a socket on said body, a ball engaged in said socket, an L-shaped arm connected to said ball, a setscrew threadingly engaged in said arm, ball and socket means connecting said setscrew to said body whereby said body will be tilted about the ball upon movement of said setscrew, a pair of serrated discs having intermeshing teeth and rotatable with respect to each other, means for locking said discs against rotation, one of said discs being connected to the free end of said L-shaped arm, and a stud connected to the other of said discs.

2. The combination of a rear view mirror and adjustable supporting means therefor, said supporting means comprising a substantially L-shaped mounting arm having its vertical portion adapted to be secured to supporting structure, first ball and socket means connecting the horizontal portion of said arm to said mirror, an adjusting screw operatively connected to the vertical portion of the arm, and second ball and socket means connecting said screw to said mirror at a point spaced vertically from the first ball and socket means, whereby the mirror may be adjusted from side to side about a vertical axis passing through both ball and socket means and whereby the mirror may be adjusted upwardly and downwardly by tilting about the first ball and socket means during actuation of said screw.

3. The device as defined in claim 2 together with an internally threaded sleeve pivoted to the vertical portion of said arm for rocking movement about a horizontal axis, said adjusting screw operatively engaging said sleeve.

4. The device as defined in claim 2 wherein the vertical portion of said arm is provided with an eye, a horizontal pin extending transversely and journalled rotatably in said eye, and an internally threaded sleeve carried by said pin, said adjusting screw being in operative engagement with said sleeve.

References Cited in the file of this patent

UNITED STATES PATENTS

| | | |
|---|---|---|
| 1,114,559 | Weed | Oct. 20, 1914 |
| 1,565,291 | Pearch | Dec. 15, 1925 |
| 1,634,748 | Ischinger | July 5, 1927 |
| 1,643,420 | Porter | Sept. 27, 1927 |
| 1,650,161 | Streiff | Nov. 22, 1927 |
| 1,672,559 | Doble | June 5, 1928 |
| 1,893,245 | Ritz-Woller | Jan. 3, 1933 |
| 2,493,546 | Orser | Jan. 3, 1950 |
| 2,605,676 | Couch | Aug. 5, 1952 |
| 2,663,224 | Younglove | Dec. 22, 1953 |
| 2,778,273 | Fellmeth | Jan. 22, 1957 |

FOREIGN PATENTS

| | | |
|---|---|---|
| 423,815 | Great Britain | Feb. 8, 1935 |
| 558,481 | Great Britain | Jan. 6, 1944 |